(12) United States Patent
Wu et al.

(10) Patent No.: US 9,485,824 B2
(45) Date of Patent: Nov. 1, 2016

(54) PURELY RESISTIVE DIMMING CIRCUIT

(71) Applicant: UNITY OPTO TECHNOLOGY CO., LTD., New Taipei (TW)

(72) Inventors: Chih-Hsien Wu, New Taipei (TW); Wei Chang, New Taipei (TW); Kai-Cheng Chuang, New Taipei (TW); Szu-Chien Chen, New Taipei (TW)

(73) Assignee: Unity Opto Technology Co., Ltd., New Taipei (TW)

( * ) Notice: Subject to any disclaimer, the term of this patent is extended or adjusted under 35 U.S.C. 154(b) by 0 days.

(21) Appl. No.: 14/324,364

(22) Filed: Jul. 7, 2014

(65) Prior Publication Data
US 2015/0334801 A1    Nov. 19, 2015

(30) Foreign Application Priority Data

May 16, 2014   (TW) .............................. 103208607 U

(51) Int. Cl.
*H05B 33/08*   (2006.01)

(52) U.S. Cl.
CPC ...... *H05B 33/0845* (2013.01); *H05B 33/0812* (2013.01); *H05B 33/0815* (2013.01); *H05B 33/0821* (2013.01)

(58) Field of Classification Search
CPC .......... H05B 33/0803; H05B 33/0806; H05B 33/0809; H05B 33/0842; H05B 33/0845; H05B 39/04
See application file for complete search history.

(56) References Cited

U.S. PATENT DOCUMENTS

| | | | | |
|---|---|---|---|---|
| 5,589,823 A * | 12/1996 | Lange | ................... | G01F 23/247 340/618 |
| 8,299,724 B2 * | 10/2012 | Huynh | ................. | H05B 33/083 315/291 |
| 8,638,043 B2 * | 1/2014 | Chiang | ................ | H05B 33/083 315/291 |
| 8,890,427 B2 * | 11/2014 | Hodrinsky | ......... | H05B 33/0809 315/201 |
| 2008/0143275 A1 * | 6/2008 | Hoffman | ................. | F21L 4/027 315/309 |
| 2010/0134018 A1 * | 6/2010 | Tziony | ................. | H05B 33/083 315/122 |
| 2011/0127920 A1 * | 6/2011 | Huang | ............... | H05B 33/0809 315/192 |
| 2012/0038284 A1 * | 2/2012 | Setomoto | ........... | H05B 33/0827 315/192 |
| 2012/0043884 A1 * | 2/2012 | Lee | ........................... | F21K 9/17 315/32 |
| 2012/0068616 A1 * | 3/2012 | Akiyama | ........... | H05B 33/0809 315/201 |
| 2013/0154489 A1 * | 6/2013 | Chang | .................... | H05B 37/02 315/192 |
| 2013/0193851 A1 * | 8/2013 | Alon | ........................ | H03H 7/00 315/121 |
| 2013/0257282 A1 * | 10/2013 | Van Den Berg | ... | H05B 33/0821 315/122 |
| 2014/0042925 A1 * | 2/2014 | Wang | .................. | H05B 33/083 315/232 |
| 2014/0049174 A1 * | 2/2014 | Radermacher | ..... | H05B 33/0821 315/200 R |
| 2014/0062317 A1 * | 3/2014 | Lee | ....................... | H05B 33/083 315/185 R |
| 2014/0346954 A1 * | 11/2014 | Li | ....................... | H05B 33/0809 315/121 |
| 2014/0361711 A1 * | 12/2014 | Takahashi | .......... | H05B 33/0812 315/294 |
| 2015/0110141 A1 * | 4/2015 | Mo | ........................... | H01S 5/06 372/38.02 |

* cited by examiner

*Primary Examiner* — Jason M Crawford
*Assistant Examiner* — Kurtis R Bahr
(74) *Attorney, Agent, or Firm* — Rosenberg, Klein & Lee

(57) ABSTRACT

Disclosed is a purely resistive dimming circuit for driving LEDs to emit light and support an LED dimming function. The LEDs are divided into a first string and a second string connected in series with each other. The purely resistive dimming circuit is respectively and electrically coupled to an anode terminal of the first string and an anode terminal of the second string by a driving resistor and a current limiting resistor which are connected in series with each other. The resistance of the driving resistor restricts the LEDs to emit light at different stages to enhance the working efficiency of circuits, while using the property of the current limiting resistor to limit the overvoltage current, so as to achieve a constant power operating effect.

3 Claims, 5 Drawing Sheets

PURELY RESISTIVE DIMMING CIRCUIT

CROSS-REFERENCE TO RELATED APPLICATIONS

This non-provisional application claims priority under 35 U.S.C. §119(a) on Patent Application No(s). 103208607 filed in Taiwan, R.O.C. on May 16, 2014, the entire contents of which are hereby incorporated by reference.

BACKGROUND OF THE INVENTION

1. Field of the Invention

The present invention relates to the technical field of a driving circuit applied in a light emitting diode (LED) lamp, and more particularly to a purely resistive dimming circuit that supports a TRI-electrode AC switch (TRIAC) dimming, drives the LED to emit lights at different stages, and uses the impedance property of a thermistor to overcome the problems of the conventional driving circuit of an incandescent lamp that cannot be operated at a constant power and has a low dimming efficiency. Therefore, the purely resistive driving circuit is applicable in the LED lamp and substitutes the existing complicated circuit structure having an inductor, a control chip and/or a holding current, etc.

2. Description of the Related Art

In general, most control circuits of an LED lamp are switch components for controlling the phase, such as a silicon controlled rectifier (SCR) or a TRIAC for changing the voltage phase of an input power, and changing the magnitude of the driving voltage outputted from the control circuit by the method of switching the conduction angle of the voltage phase, so as to adjust the intensity of driving current passing into the LED light source and achieve a dimming effect. Although the dimming device of this sort has the advantages of simple control and convenient installation, yet the voltage waveform of the input power is distorted to cause problems such as low PF and increased voltage harmonics. According to the current/voltage (IN) characteristic curve of the LED, the LED is not a linear component; in other words, voltage and current are not in direct proportion. Therefore, the aforementioned dimming method may have an imprecise dimming effect due to the unequal variation of the driving voltage and the driving current, and thus causing a reactive power. In addition, if the operating voltage flowing into the control circuit is affected by the property of the TRIAC component and becomes too low, and the current passing through the TRIAC is lower than the required operating current, the TRIAC will switch its working status repeatedly, and the driving current will be non-continuous, and the LED will blink, so as to reduce the illumination quality.

With reference to FIG. 1 for the circuit diagram and waveform diagram of a conventional LED driving circuit having a holding current, the driving circuit 1 comprises a dimmer 10 being a TRIAC element, a bridge rectifier 11, a holding switch 12, a holding resistor ($R_H$) 13 and a filter capacitor 14, wherein the bridge rectifier 11 is provided for receiving an external power through the dimmer 10 and rectifying the power into an input voltage ($V_{in}$) and an input current ($I_{in}$), and the filter capacitor 14 receives and converts the input current into a driving current ($I_L$) to be supplied to the LED. In addition, the holding switch 12 is an N-type Metal Oxide Semiconductor Field-Effect Transistor (N-type MOSFET) having a drain coupled to the bridge rectifier 11 for receiving an input current, a source coupled to the holding resistor 13, and a gate for receiving a holding voltage ($V_H$), so that the holding resistor 13 receives the holding voltage through the holding switch 12 to output a holding current ($I_{hold}$), and $I_{hold} = (V_H - V_{GS\_N-MOSFET})/R_H$, and the holding current ($I_{hold}$ is provided for maintaining the dimmer 10 at a stable operating status to improve the dimming precision). However, the installation of the holding switch 12 and the holding resistor 13 undoubtedly has a certain power loss and affects the overall circuit working efficiency, and thus causing a low energy utilization rate and failing to comply with the requirements of electric appliances.

In view of the aforementioned problems of the conventional dimming circuit, it is a main subject of the present invention to simplify the present driving circuit structure and supports TRIAC dimming and still maintains a constant driving current without requiring the components such as inductor, control chip and/or holding current, so as to achieve the effects of ensuring the illumination quality of the lamp and lowering the manufacturing cost.

SUMMARY OF THE INVENTION

In view of the aforementioned problems of the prior art, it is a primary objective of the present invention to provide a purely resistive dimming circuit capable of improving the overall illumination efficiency and the dimming precision by driving the LED to emit light at different stages, while using a thermistor (with a positive temperature Coefficient, PTC) to limit current and maintain the operation of LED at a constant power, so as to achieve the effects of lowering the total cost and improving the economic benefits.

To achieve the aforementioned objective, the present invention provides a purely resistive dimming circuit comprising a dimming module, a conversion module and an output module, and the conversion module is electrically coupled to the dimming module and the output module for converting an input voltage received from the dimming module into an output current, and then outputting the output current from the output module to at least one LED, characterized in that the LED comes with a plural quantity and the LEDs are divided into a first string and a second string which are connected in series with each other, and the output module is comprised of a plurality of driving resistors and a plurality of current limiting resistors, and the driving resistors and the current limiting resistors are connected in series with each other respectively, and the output module is electrically coupled to an anode terminal of the first string and an anode terminal of the second string respectively through the driving resistor and the current limiting resistor which are connected in series with each other.

Wherein, the LED is a high-voltage LED (HV-LED), and the current limiting resistor is a ceramic thermistor of a positive temperature coefficient, and the dimming module is comprised of a TRIAC and a bridge rectifier, and the conversion module is comprised of an energy storing capacitor and a stable voltage resistor, so that the overall circuit is purely resistive without any electromagnetic interference (EMI) issue. In addition, if the input voltage rises, the output voltage will rise to increase the overall circuit temperature according to the property of the thermistor. Now, the resistance value of the current limiting resistor will increase to drop the actual output of the current to the LED, so as to achieve a constant power.

In summation of the description above, the present invention adopts the idea of reverting to simplicity to simplify the LED driving circuit structure, and makes use of the impedance property of the driving resistor to achieve the effect of driving the LEDs with different stages, and makes use of the physical property of the thermistor installed at an output terminal of the output terminal to drive the output voltage to vary with the input voltage, so as to achieve the protection function as well as preventing the LEDs from being affected by a large current generated from an overvoltage or reducing the illumination quality.

DETAILED DESCRIPTION OF THE PREFERRED EMBODIMENTS

The technical content of the present invention will become apparent with the detailed description of preferred embodiments and the illustration of related drawings as follows.

Figure 1:
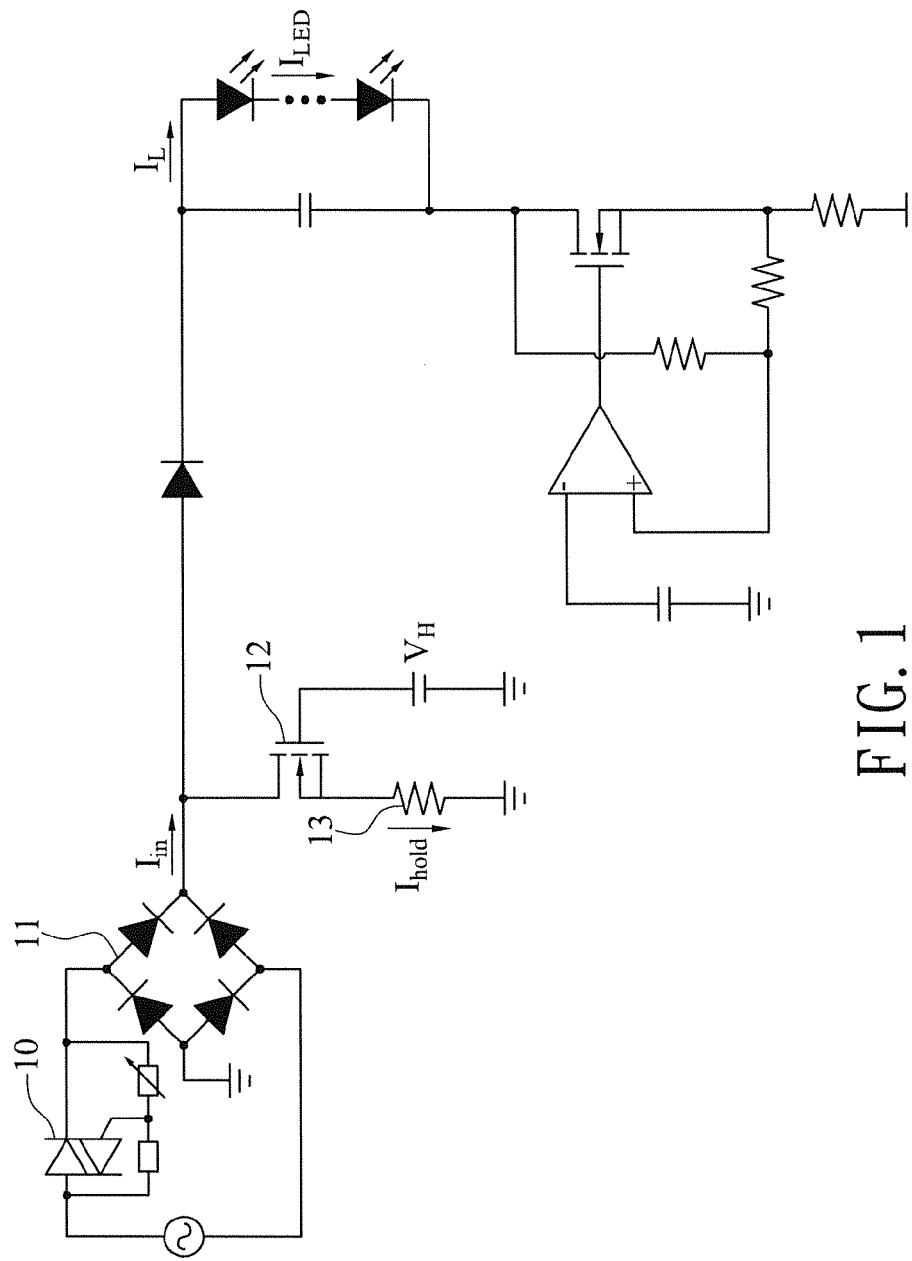
FIG. 1 is a circuit diagram of a conventional LED driving circuit having a holding current.
Figure 2:
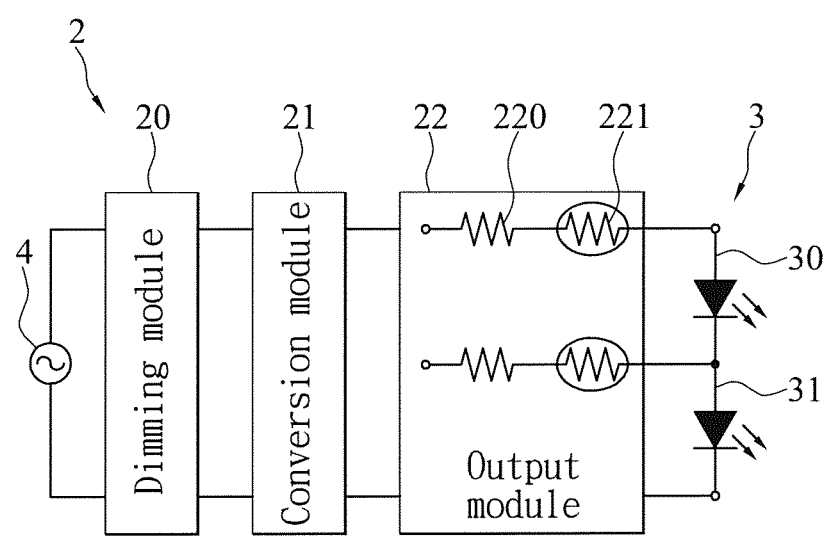
FIG. 2 is a block diagram of a preferred embodiment of the present invention.
Figure 3:
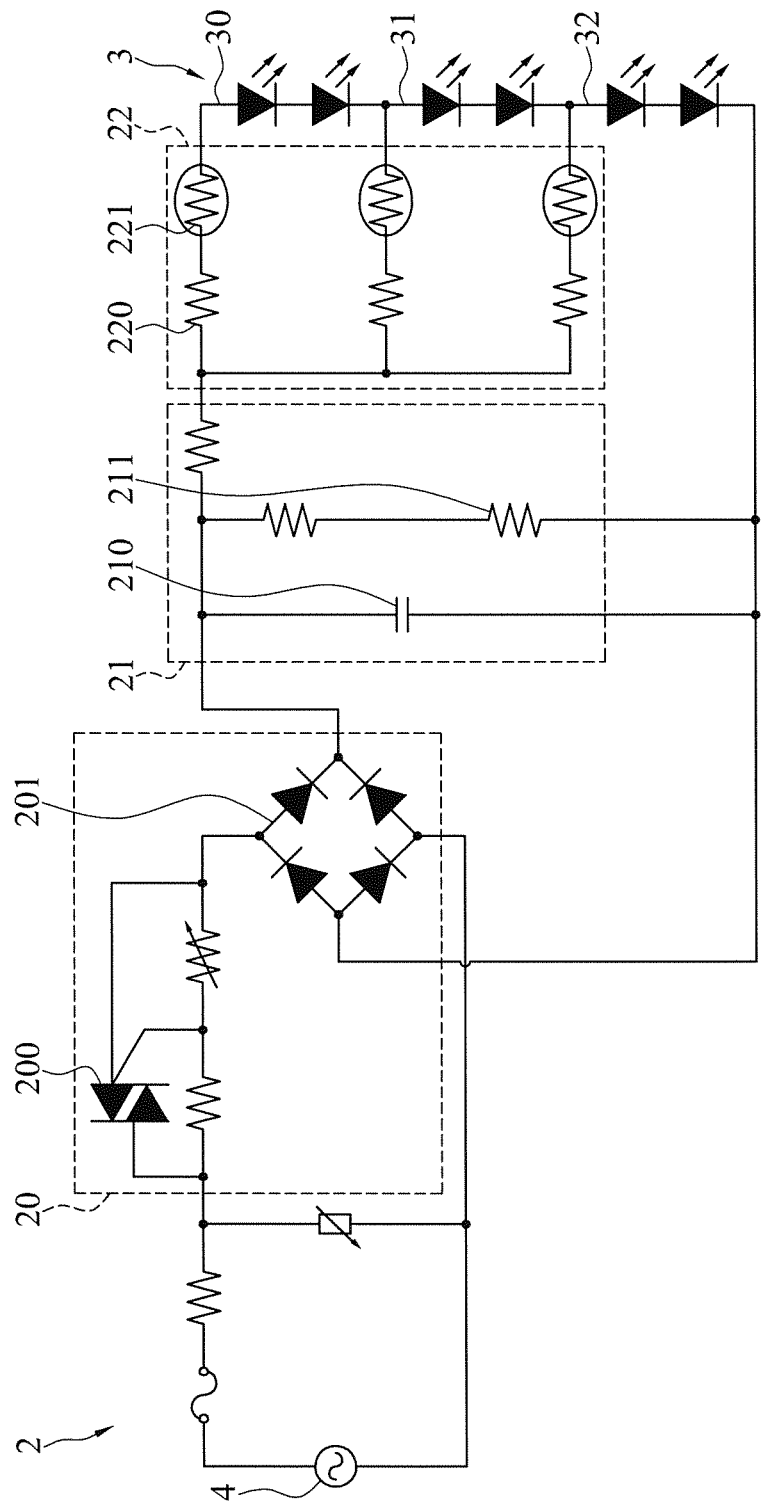
FIG. 3 is a circuit diagram of a preferred embodiment of the present invention.

With reference to FIGS. 2 and 3 for a block diagram and a circuit diagram of a purely resistive dimming circuit in accordance with a preferred embodiment of the present invention respectively, the purely resistive dimming circuit 2 is applied in a 220V LED lamp, and electrically coupled to a plurality of LEDs 3 for driving the LEDs 3 to emit light and supporting the function of adjusting the brightness of the LEDs 3, wherein the LEDs 3 are high-voltage LEDs. The LEDs 3 are divided into a first string 30 and a second string 31 which are connected in series with each other, and the purely resistive dimming circuit 2 includes a dimming module 20, a conversion module 21 and an output module 22. The dimming module 20 is comprised of a TRIAC 200 and a bridge rectifier 201, and the TRIAC 200 is electrically coupled to an external power supply 4, and an input terminal of the bridge rectifier 201 is electrically coupled to the TRIAC 200, so that when the brightness of the LEDs 3 is adjusted, the TRIAC 200 will adjust the phase conduction angle of the AC voltage of the external current and the bridge rectifier 201 will rectify the current into an input voltage. The conversion module 21 is comprised of an energy storing capacitor 210 and a stable voltage resistor 211, and the energy storing capacitor 210 is connected to the stable voltage resistor 211 and then electrically coupled to an output terminal of the bridge rectifier 201 for converting the input voltage received by the dimming module 20 into an output current and then outputting the output current to the LED 3 through the output module 22.

The output module 22 includes a plurality of driving resistors 220 and a plurality of current limiting resistors 221 such as a ceramic thermistor with a positive temperature coefficient, and the driving resistors 220 are connected in series with the corresponding current limiting resistors 221 respectively, and the output module 22 is electrically coupled to an anode terminal of the first string 30 and an anode terminal of the second string 31 through the driving resistor 220 and the current limiting resistor 221 which are connected in series with each other. For example, if the LEDs 3 are divided into three strings connected in series with one another, or each of the first string 30, the second string 31 and a third string 32 has a plurality of LEDs 3, and the output module 22 includes three driving resistors 220 and three current limiting resistors 221, then the driving resistors 220 are connected in series with the current limiting resistors 221 respectively to form three resistor groups, and the three resistor groups are connected in parallel with one another. In addition, the output module 22 is electrically coupled to an anode terminal of the LED of the first string 30 through the first resistor group, electrically coupled to an anode terminal of the LED of the second string 31 through the second resistor group, and electrically coupled to an anode terminal of the LED of the third string 32 through the third resistor group. As the voltage value of the input voltage increases, the output current will increase to overcome the resistance values of the first, second and third resistor groups sequentially, and then light up the LEDs 3 at a stage, so as to improve the overall light emitting efficiency and the dimming precision.

Figure 4:
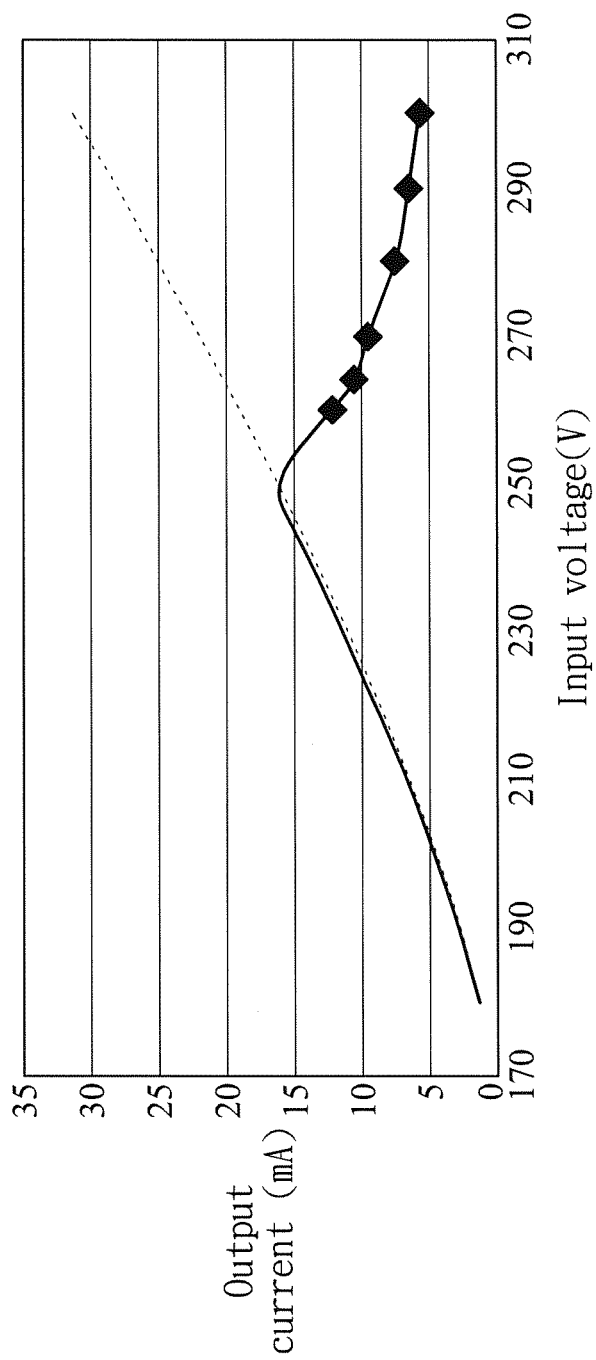
FIG. 4 is an input voltage versus output current graph of a preferred embodiment of the present invention.
Figure 5:
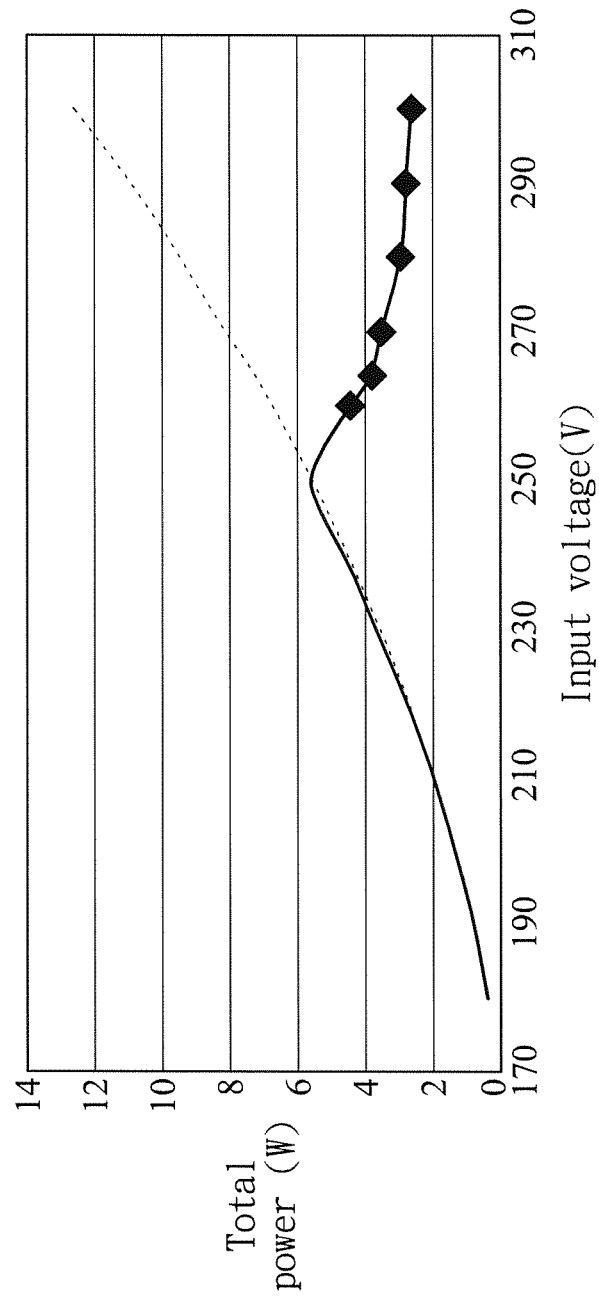
FIG. 5 is an input voltage versus input voltage of a preferred embodiment of the present invention.

Compared with the purely resistive driving circuit adopted by a conventional incandescent lamp with tungsten filament, the purely resistive dimming circuit 2 of this preferred embodiment of the present invention adds a thermistor installed at an output terminal of the overall circuit (which is the output terminal of the output module 22), such that if the input voltage rises, the output current will increase and cause the temperature of the thermistor to rise, so that the resistance value of the current limiting resistor will increase accordingly. Therefore, damages of the LEDs caused by a too-large output current from the output module 2 can be prevented to provide the protection function if the input voltage is an overvoltage. In FIG. 4, actual measurements obtained from experiments show the following result. Compared with the purely resistive driving circuit of a conventional incandescent lamp with tungsten filament, the purely resistive dimming circuit 2 has an output current which does not increase significantly anymore after the input voltage rises to 250V. Therefore, the total power of the purely resistive dimming circuit 2 is situated at a constant status as shown in FIG. 5 to ensure the operating stability and the light emitting efficiency of the LEDs 3.

What is claimed is:
1. A purely resistive dimming circuit, being consisted of a dimming module, a conversion module and an output module, and the conversion module being electrically coupled to the dimming module and the output module for converting an input voltage received from the dimming module into an output current, and then outputting the output current from the output module to at least one LED, characterized in that the LED comes with a plural quantity and the LEDs are divided into a first string and a second string which are connected in series with each other, and the output module is comprised of a plurality of resistive driving circuits, each driving circuit including a driving resistor and a current limiting resistor defined by a positive temperature coefficient thermistor connected in series with each other, and each driving circuit is respectively electrically coupled to an anode terminal of the first and second strings,
wherein the dimming module is comprised of a TRIAC and a bridge rectifier, and the conversion module is comprised of an energy storing capacitor and a stable voltage resistor,
wherein the conversion module is directly connected to the output module via a single terminal,
wherein the stable voltage resistor and the energy storing capacitor are connected in parallel to each other, a terminal of the energy storing capacitor is directly connected to an output terminal of the bridge rectifier, an another terminal of the energy storing capacitor is directly connected to the stable voltage resistor.

2. The purely resistive dimming circuit of claim 1, wherein the LED is a high-voltage LED.

3. The purely resistive dimming circuit of claim 2, wherein the current limiting resistor is a ceramic thermistor of a positive temperature coefficient.

* * * * *